US010887795B2

United States Patent
(12) United States Patent
Deparisse

(10) Patent No.: US 10,887,795 B2
(45) Date of Patent: Jan. 5, 2021

(54) OVER-THE-AIR (OTA) WI-FI OFFLOADING

(71) Applicant: Fortinet, Inc., Sunnyvale, CA (US)

(72) Inventor: Maxime Deparisse, Mougins (FR)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/218,754

(22) Filed: Dec. 13, 2018

(65) Prior Publication Data

US 2020/0196191 A1 Jun. 18, 2020

(51) Int. Cl.

| | |
|---|---|
| ***H04W 28/08*** | (2009.01) |
| ***H04L 12/26*** | (2006.01) |
| ***H04W 36/22*** | (2009.01) |
| ***H04L 12/803*** | (2013.01) |
| ***H04L 12/801*** | (2013.01) |
| ***H04W 88/10*** | (2009.01) |
| ***H04W 84/18*** | (2009.01) |

(52) U.S. Cl.

CPC ............. *H04W 28/08* (2013.01); *H04L 43/16* (2013.01); *H04L 47/11* (2013.01); *H04L 47/125* (2013.01); *H04W 36/22* (2013.01); *H04W 84/18* (2013.01); *H04W 88/10* (2013.01)

(58) Field of Classification Search

CPC ..... H04W 28/08; H04W 36/22; H04W 84/18; H04W 88/10; H04L 43/16; H04L 47/11; H04L 47/125

See application file for complete search history.

(56) References Cited

U.S. PATENT DOCUMENTS

2008/0291846 A1* 11/2008 Lu ........................ H04W 40/246 370/254
2009/0213730 A1* 8/2009 Zeng ..................... H04W 24/04 370/217
2012/0082161 A1* 4/2012 Leung ................ H04L 12/4633 370/392
2014/0177840 A1* 6/2014 Liu ....................... H04W 28/08 380/270
2015/0117210 A1* 4/2015 Yang ..................... H04W 24/02 370/235
2015/0117328 A1* 4/2015 Llairo ................... H04W 28/08 370/329
2016/0345192 A1* 11/2016 Garg ..................... H04W 24/04

* cited by examiner

*Primary Examiner* — Kashif Siddiqui
(74) *Attorney, Agent, or Firm* — Jaffery Watson Mendonsa & Hamilton LLP

(57) ABSTRACT

Systems and methods for OTA Wi-Fi offloading are provided. According to one embodiment, a first AP of a private network provides connectivity between one or more wireless client devices and a wired network portion of the private network. The first AP is coupled to a switch via a first wired link. The first AP determines whether the traffic being transmitted on the first wired link exceeds a configurable or predefined threshold. When the determination is affirmative, the first AP offloads a portion of the traffic to a second AP of the private network by: (i) dynamically establishing a mesh like link with the second AP; and causing the traffic to be delivered to the wired portion of the private network via a second wired link, coupling the second AP to the switch, by transmitting the portion of the traffic via the mesh like link to the second AP.

23 Claims, 10 Drawing Sheets

| AP 1 | | AP 2 | | | AP 3 | |
|---|---|---|---|---|---|---|
| CD 1_1 (DATA RATE) | CD 1_2 (DATA RATE) | CD 2_3 (DATA RATE) | CD 2_4 (DATA RATE) | CD 2_5 (DATA RATE) | CD 3_6 (DATA RATE) | CD 3_7 (DATA RATE) |
| 200 MBPS | 300 MBPS | 700 MBPS | 200 MBPS | 100 MBPS | 800 MBPS | 200 MBPS |
FIG. 6A
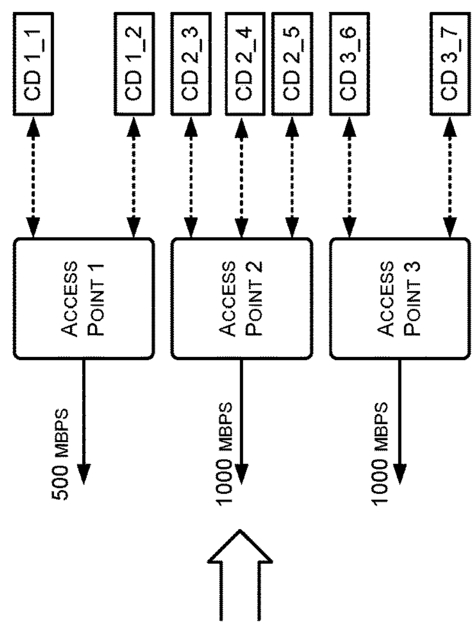
FIG. 6B
| AP 1 | | | | AP 2 | | AP 3 |
|---|---|---|---|---|---|---|
| CD 1_1 (DATA RATE) | CD 1_2 (DATA RATE) | CD 2_5 (DATA RATE) | CD 3_7 (DATA RATE) | CD 2_3 (DATA RATE) | CD 2_4 (DATA RATE) | CD 3_6 (DATA RATE) |
| 200 MBPS | 300 MBPS | 100 MBPS | 200 MBPS | 700 MBPS | 200 MBPS | 800 MBPS |
FIG. 6C
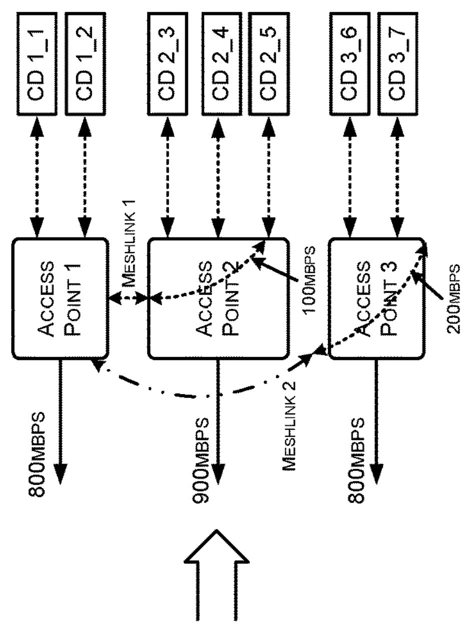
FIG. 6D

OVER-THE-AIR (OTA) WI-FI OFFLOADING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to computer networks and wireless networks, and, in particular, to a system and method for Over-The-Air (OTA) Wi-Fi offloading.

Description of the Related Art

As data rates demanded/expected by various computing devices and applications connected to a wireless network (e.g., those enabled by Wi-Fi as described further below) increase, more wireless access points (APs) and associated infrastructure and wiring are being deployed.

Wi-Fi refers to a technology for wireless local area networking with devices based on the Institute of Electrical and Electronics Engineers (IEEE) 802.11 family of standards for wireless networking. The IEEE 802.11 ac standard, with which most computing mobile computing devices, including smartphones, tablet computers, and laptops, and fixed-location computing devices, e.g., desktop computers, are compliant, provides for high-throughput wireless local area networks (WLANs) on the 5 gigahertz (GHz) band. The specification has multi-station throughput of at least 1 gigabit per second (1 Gbps) and single-link throughput of at least 867 megabits per second (867 Mbps) for a 2×2 stream 802.11ac client.

Typically, APs have a maximum throughput of 1 Gbps as a result of data transmission limitations through current physical cables. This limit however is easily reached nowadays. Increasing the throughput to cater to either the increasing number of computing devices, or high data rates demanded by them, or both, currently requires installation of additional equipment and associated wiring that is cumbersome and costly. Additionally, such infrastructure upgrades typically require network downtime while the changes are implemented.

Currently, various computing devices are 'bound' to an AP at the Media Access Control (MAC) layer, wherein the client device is using a particular Basic Service Set Identifier (BSSID) to access a WLAN of a private enterprise network, for example. There is, hence, a possibility that while an AP within an enterprise network, for example, is fully loaded (that is, has reached its Gig Ethernet maximum throughput capacity as a result of the wired bottleneck), another one has idle capacity since the data demand of wireless devices connected to it at the time may be less. For instance, it is quite possible that while an AP has many wireless devices connected to it, another AP quite close to it has no connected wireless devices or fewer connected wireless devices. This is obviously an inefficient utilization of resources.

As an alternative to or supplement to existing AP load balancing or radio load balancing techniques used in high density radio networks like universities and airports, there exists a need for systems and methods that enable more efficient utilization of existing network resources, e.g., Access Points (APs).

SUMMARY

Systems and methods are described for Over-The-Air (OTA) Wi-Fi offloading. According to one embodiment, a first wireless access point (AP) of a private network provides connectivity between one or more wireless client devices and a wired network portion of the private network. The first AP is coupled to a switch via a first wired link. The first AP makes a determination regarding whether an amount of traffic being transmitted on the first wired link exceeds a configurable or predefined threshold. When the determination is affirmative, the first AP offloads a portion of the traffic to a second AP of the private network by: (i) dynamically establishing a mesh like link between the first AP and the second AP; and causing the traffic to be delivered to the wired portion of the private network via a second wired link, coupling the second AP to the switch, by transmitting the portion of the traffic via the mesh like link to the second AP.

Other features of embodiments of the present invention will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 6A to 6D elaborate upon how mesh like links are formed in accordance with an embodiment of the present invention.

DETAILED DESCRIPTION

Figure 1A:
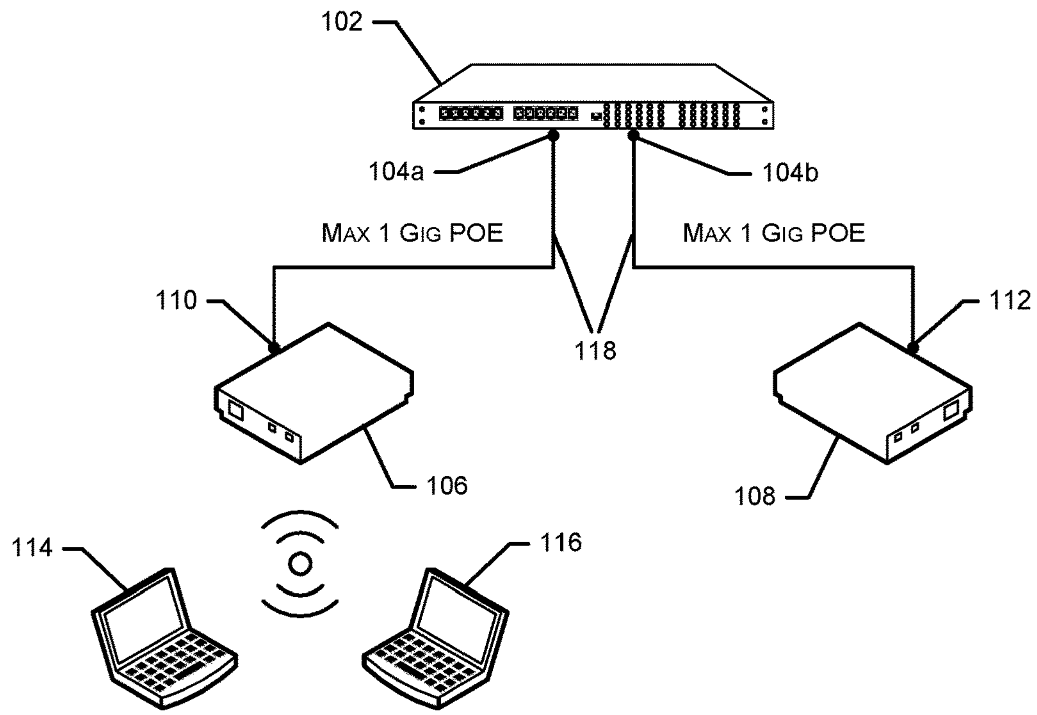
FIG. 1A to FIG. 1C illustrate various scenarios in the context of prior art wireless networking technology.

System and methods are described for OTA Wi-Fi offloading. In the following description, numerous specific details are set forth in order to provide a thorough understanding of embodiments of the invention. It will be apparent to one skilled in the art that the embodiments may be practiced without some of these specific details.

Embodiments of the invention disclosed include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators (e.g., in terms of a proper site survey that allows a high density deployment).

Embodiments of the invention disclosed may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, e.g. ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g. computer programming code like software or firmware).

Various methods described herein may be practiced by combining one or more machine-readable storage media containing the code according to the invention disclosed with appropriate standard computer hardware to execute the code contained therein. An apparatus for practicing various Embodiments of the invention disclosed may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Systems and methods are described for Over-The-Air (OTA) Wi-Fi offloading. In an aspect, embodiments of the present invention elaborate upon a wireless access point (AP) including: one or more processors; and a non-transitory computer readable storage medium embodying a set of instructions, which when executed by the one or more processors cause the one or more processors to perform a method including: providing connectivity between one or more wireless client devices and a wired network portion of a private network, wherein the AP can be coupled to a switch via a first wired link; determining whether an amount of traffic being transmitted on the first wired link exceeds a configurable or predefined threshold; and when the determining is affirmative, then offloading a portion of the traffic to a second wireless access point (AP) of the private network, such offloading to be carried out by: dynamically establishing a mesh like link between the AP and the second AP; and causing the traffic to be delivered to the wired portion of the private network via a second wired link, coupling the second AP to the switch by transmitting the portion of the traffic via the mesh link to the second AP. The term "mesh like link" is used in this context as both APs are both already connected to the wired portion of the network, so the link is not being used to extend wireless coverage by using a leaf AP that is disconnected from the wired network. Those skilled in the art will appreciate the Address Resolution Protocol (ARP) caches of other system may need to be updated by way of gratuitous ARP, for example, by the second AP for proper Layer 2 forwarding purposes.

In another aspect, the method can further include monitoring the amount of traffic so as to enable the step of determining.

In yet another aspect, the step of determining can include requesting information regarding the amount of traffic from a wireless local area network (LAN) controller (WLC) that is associated with the private network.

In an aspect, the method can further include identifying the second AP as a candidate for the mesh like link by requesting a wireless local area network (LAN) controller (WLC) associated with the private network to select an AP of a plurality of APs of the private network.

In another aspect, the method can further include identifying the portion of the traffic based on any or a combination of a type of the traffic, volume of the traffic, one or more characteristics of the traffic, and an application with which the traffic is associated.

In yet another aspect, the AP and the second AP can include dual-band APs, each having a 2.4 gigahertz (GHz) radio and a 5 GHz radio.

In an aspect, the AP can communicate with the one or more wireless devices via the 2.4 GHz radio and can establish the mesh like link via the 5 GHz radio. Alternatively, the AP can communicate with the one or more wireless devices via the 5 GHz radio and can establish the mesh like link via the 2.4 GHz radio. Any other configuration is also well within the scope of the present invention.

In an aspect, embodiments of the present invention elaborate upon a method including providing, by a first wireless access point (AP) of a private network, connectivity between one or more wireless client devices and a wired network portion of the private network, wherein the first AP can be coupled to a switch via a first wired link; determining, by the first AP, whether an amount of traffic being transmitted on the first wired link exceeds a configurable or predefined threshold; and when the determining is affirmative, then offloading, by the first AP, a portion of the traffic to a second wireless access point (AP) of the private network by: dynamically establishing a mesh like link between the first AP and the second AP; and causing the traffic to be delivered to the wired portion of the private network via a second wired link, coupling the second AP to the switch, by transmitting the portion of the traffic via the mesh like link to the second AP.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

A wireless Access Point (AP) is an example of a wireless network device that comprises one or more radios and allows computing devices to connect to a wired network or other computing devices. An AP typically includes a local link interface to communicate with local client devices, and a downlink/uplink interface to communicate with other APs. With the creation of APs, network users and/or administrators are able to add computing devices to a network with fewer physical cables and are able to increase available bandwidth to wireless-enabled computing devices by deploying additional APs tuned to non-overlapping channels. An AP may be directly connected to a wired Ethernet connection, providing wireless connections to other devices and thereby allowing the other devices to utilize the wired Ethernet connection via radio frequency links. APs may support connection of multiple computing devices to a single wired connection and may send/receive data packets using radio frequencies defined by the Institute of Electrical and Electronics Engineers (IEEE) 802.11 family of wireless networking standards.

Typically, a radio, depending on its characteristics, has multiple channels and a defined coverage range. For instance, a 2.4 GHz frequency radio has 3 non-overlapping channels (e.g., (1, 6, 11), (2, 7, 12), (3, 8, 13) or (4, 9, 14) depending on the region code) and a 5 GHz frequency radio has 37 channels (where the number of actual usable channels depends on, among other factors, the make of the AP, indoor or outdoor placement of the AP, height above ground, nearby obstructions, type of antenna, country code, channel aggregation, etc.). The range of a typical 5 GHz radio of an AP is half of that of a typical 2.4 GHz radio of an AP. As multiple radios may be incorporated in a single AP, it is important to have non-overlapping channels within the AP and across multiple APs. For instance, in a dual band/radio AP, one channel of 2.4 GHz may be positioned along with one channel of 5 GHz radio, allowing concurrent 2.4 GHz and 5 GHz access across 802.11a/n and 802.11b/g/n connections.

Figure 1B:
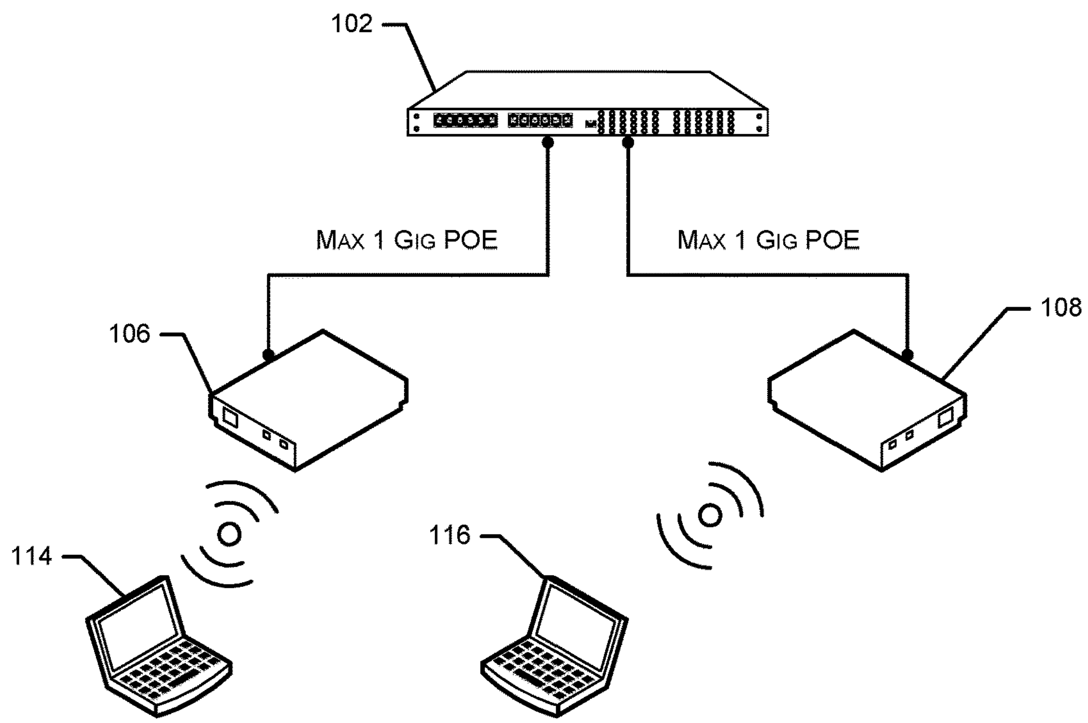
Figure 1C:
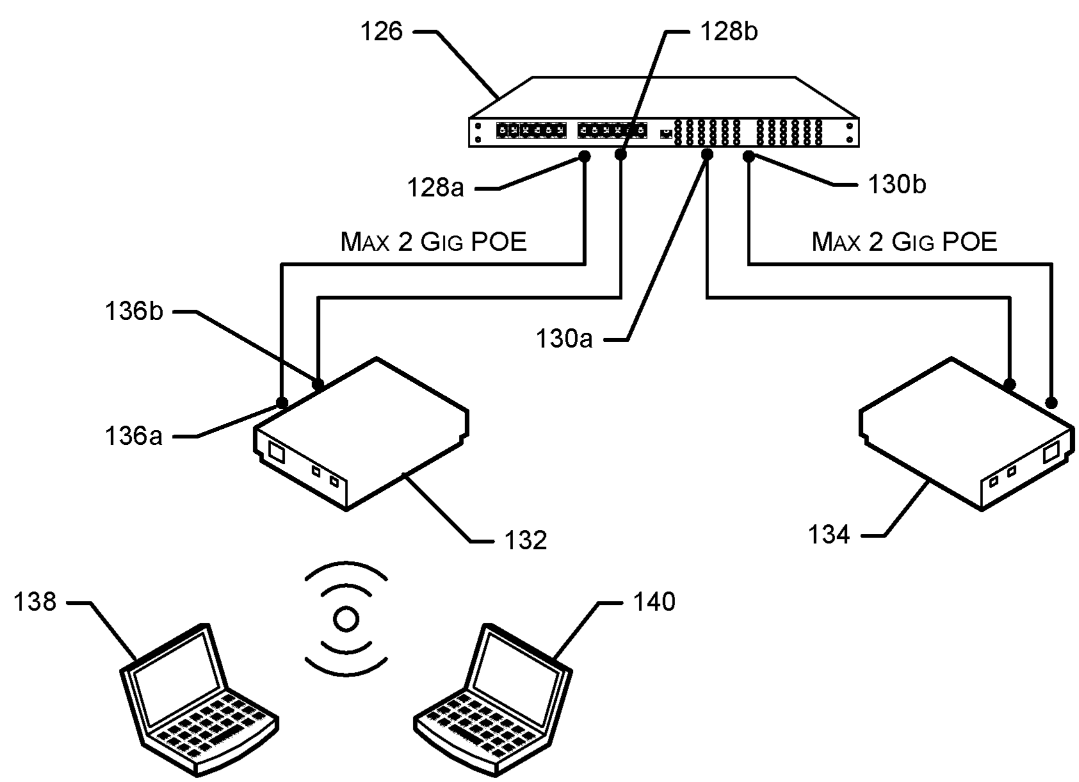

FIGS. 1A to 1C illustrate various wired bottleneck scenarios in the context of prior art wireless networking technology. For example, currently the 802.11 standard is commonly used by WLAN clients (e.g., 802.11 ac MCS9 to deliver 867 Mbps). In the context of FIGS. 1A-C, a network switch 102 is connected to a network backbone and in turn has several ports (two shown as 104*a* and 104*b*) to connect to different Access Points (APs) shown as 106 and 108 and having corresponding ports 110 and 112 for connecting to network switch 102. The APs, in turn, provide Wi-Fi network connectivity to computing devices shown as 114 and 116. Each AP and computing device is uniquely identified on the network.

An AP is connected to a port on switch 102 by a wired link (Ethernet cable). Such cables may also carry sufficient power to operate the APs and in this case they are termed as Power over Ethernet (PoE) cables. Such cables are illustrated as 118, and connect to network switch 102 or APs that are as well correspondingly configured to accept PoE cables.

As can be appreciated, the maximum data carrying capacity of an AP is limited by that made available by its wired link. Trying to move more data than this limit leads to performance deterioration in the associated computing devices due to network congestion. This limit may be referred to as the wired bottleneck, the wired link data rate threshold or simply as the threshold herein.

As illustrated in FIG. 1A, AP 106 can have a threshold of 1 Gbps and thus imposes such limit on computing devices 114 and 116 presently connected to it. If the total traffic requirement of devices 114 and 116 in the aggregate exceeds 1 Gbps, network congestion will occur with associated negative effects, e.g., reduced quality of service, queuing delay, packet loss, blocking of new connections etc. As a result, users of computing devices 114 and 116 may experience delays/interruptions in applications they may be running at the time of such congestion if they require data from an external network, for example. Those skilled in the art will appreciate that one possible choice is to perform an AP handoff of one of devices 114 or 116 from AP 106 to AP 108 as illustrated by FIG. 1B; however, the wired bottleneck remains.

FIG. 1B illustrates another configuration of a network in which AP handoff is used. As illustrated, computing device 114 has been connected to AP 106 while computing device 116 has been connected to AP 108. This may be a result of device 116 being handed off by AP 106 to AP. As a consequence, both devices can now handle internet traffic up to 1 Gbps without experiencing network congestion. However, as soon as their data requirements exceed the threshold (or more computing devices connect to the corresponding APs) network congestion can occur.

As illustrated in FIG. 1C, an AP can have multiple input ports leading to an overall higher threshold when used with a corresponding switch. For instance, a switch 126 can have two outlet ports for each AP, such ports shown as 128*a* and 128*b* for a first AP 132, and 130*a* and 130*b* for a second AP 134. Each port can have a threshold of 1 Gbps. Corresponding APs 132 and 134 can have respective ports (for instance, ports 136*a* and 136*b* for AP 132, as shown), which can enable APs 132 and 134 to provide access to an external network and offer a 2 Gbps throughput threshold to be distributed among PCs, laptops, tablets, phones, and other computing devices that are connected to APs 132 and 134. For instance AP 132 may be connected to computing devices 138 and 140. However, when this limit is reached, network congestion may again be experienced. While performance is increased in this scenario, such a solution is not scalable and trades off cost and power for the performance increase.

Figure 2:
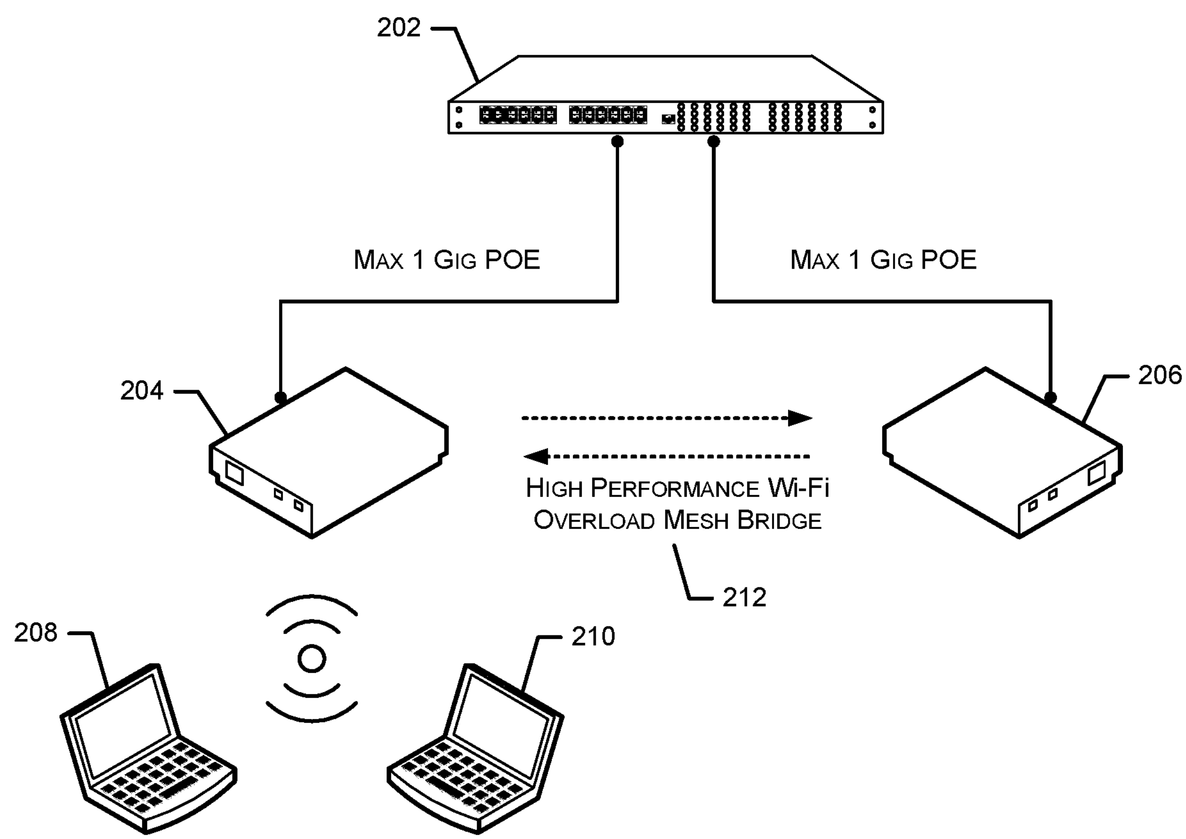
FIG. 2 illustrates the use of mesh backhaul on a second radio of an AP to perform high performance OTA Wi-Fi offloading in accordance with an embodiment of the present invention.

FIG. 2 illustrates the use of mesh backhaul between APs to perform high performance OTA Wi-Fi offloading to mitigate effects of the wired bottleneck in accordance with an embodiment of the present invention. In the context of the present example, a network system may have two APs 204 and 206, each with a 1 Gbps Power over Ethernet wired link to switch 202. AP 204 may presently be connected to computing devices 208 and 210, while AP 206 may be idle as shown, or may be carrying traffic for other devices connected to it. According to one embodiment of the present invention, when the total data traffic requirement of devices 208 and 210 exceeds the threshold of 1 Gbps that AP 202 can handle, the system can dynamically establish a high performance Wi-Fi overload mesh bridge 212 (which may be interchangeably referred to herein as a mesh link or a mesh like link) between AP 204 and AP 206 that can be used to offload excess traffic of AP 204 (which may also be referred to as the first AP) to AP 206 (which may also be referred to as the second AP). In this manner, network congestion at AP 204 or at AP 206 as a result of the wired bottleneck via their respective wired links to switch 202 can be avoided, and both computing devices 208 and 210 can continue to function optimally. In this manner, increased performance is provided in a scalable manner without the increased cost of additional cables and power consumption.

Those skilled in the art will appreciate that while offloading traffic, various implementation options are available. For instance, in a first exemplary implementation, it may be the case that traffic is offloaded on a device-by-device basis. That is, all traffic from device 210 may be offloaded to the second AP 206 whereas traffic from computing device 208 continues to be processed through the first AP 204. In another exemplary implementation, traffic offloading may be performed based on the type of traffic. For example, traffic from both computing devices 208 and 210 associated with one or more predetermined or configurable applications and/or protocols may be sent through (or processed through) the second AP 206 whereas traffic from both computing devices 208 and 210 associated with other than the one or more predetermined or configurable applications and/or protocols may continue to be handled by the first AP 204 wired port. Those skilled in the art will appreciate various other methods of dividing traffic among the first AP 204 and the second AP 206 and that any such offloading can be configured by the network manager/administrator and/or wireless LAN controller (WLC).

In one embodiment, traffic is offloaded by AP 204 on a device-by-device basis by causing all data traffic originated by or directed to computing device 210 through mesh link 212. In another exemplary embodiment, traffic associated with one or more applications and/or protocols originated by or directed to computing device 208 or 210 or both can be offloaded via mesh link 212 between AP 204 and AP 206. A limit can be set on how much traffic can be offloaded via mesh link 212 to the AP 206, irrespective of present idle capacity of AP 206. All such embodiments are fully a part of the present disclosure.

In an exemplary embodiment, a central controller (e.g., wireless LAN controller (WLC)) (not shown) can be configured in the private network to manage and control the APs. Such a central controller can be connected to the wired network, and can control dynamic establishment, management, as well as disconnection of the mesh links. The central controller can also, in real-time, decide which/what part of the traffic needs to be offloaded. Also, after offloading of traffic, if the first AP returns back to a state where the wired bottleneck is no longer an issue, the central controller and/or the first AP itself can take a part of the offloaded network traffic back from the second AP. Also, when the second AP is to offload a part of its traffic, the same established mesh link can be used to offload the traffic, or alternatively, a new mesh link can be dynamically established based on the configuration of the system of the present invention.

In an aspect, APs and client computing devices of the present invention may optionally be considered as portable network enabled devices, Internet of Things (IoT) devices, and capable of Time Division Multiple Access (TDMA), Orthogonal Frequency Division Multiplexing (OFDM), Orthogonal Frequency Division Multiple Access (OFDMA), Single Carrier Frequency Division Multiple Access (SC-FDMA), Data Over Cable Service Interface Specifications (DOCSIS) 3.x, Long Term Evolution (LTE), LTE-Advanced (LTE-A), Wi-Max, Wi-Fi, Digital Video Broadcasting-Terrestrial (DVB-T), Digital Video Broadcasting-Handheld (DVB-H), Zigbee, ZWave etc.

Figure 3A:
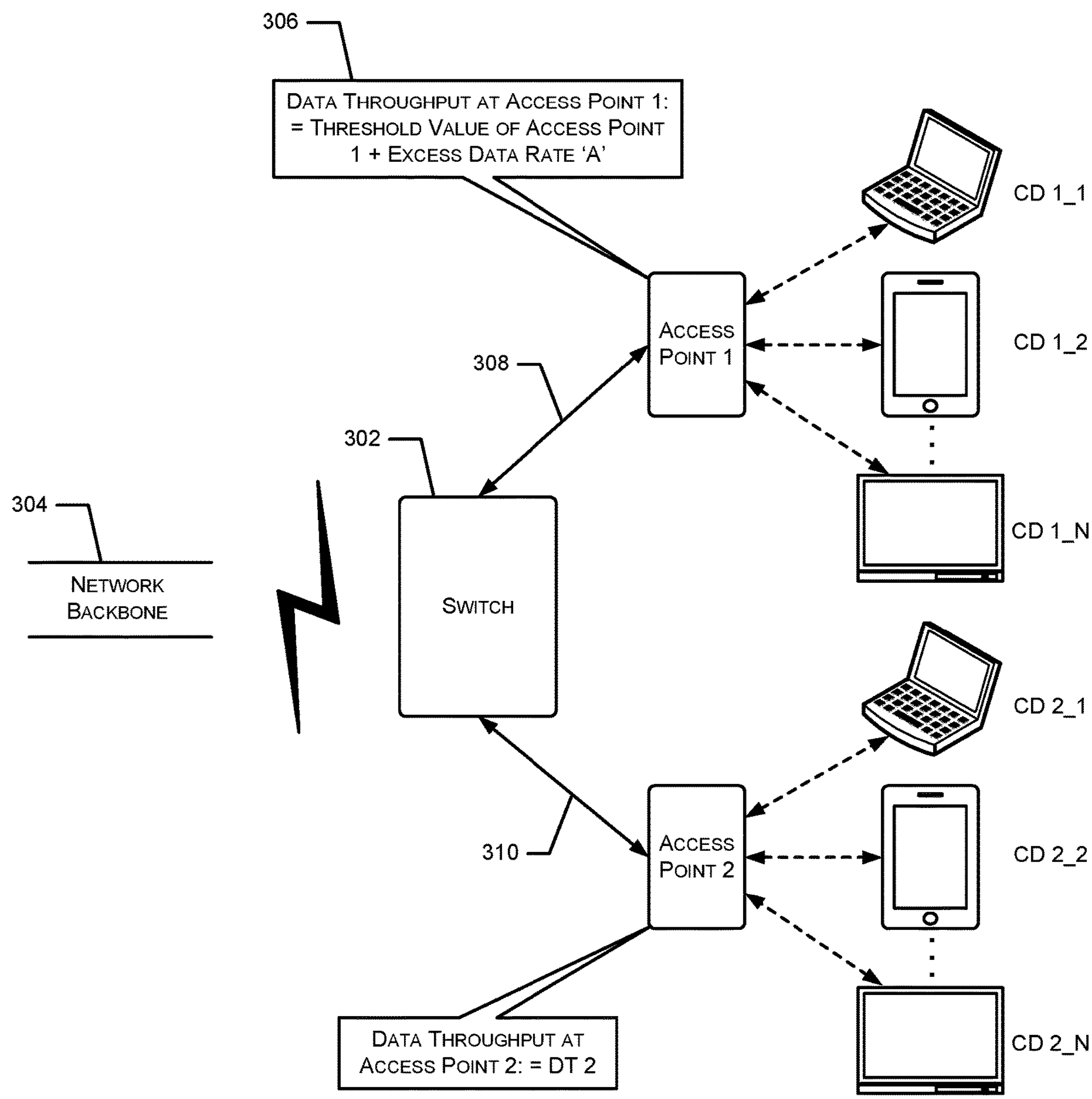
FIGS. 3A and 3B provide a high-level overview of an OTA Wi-Fi offload system in accordance with an embodiment of the present invention.
Figure 3B:
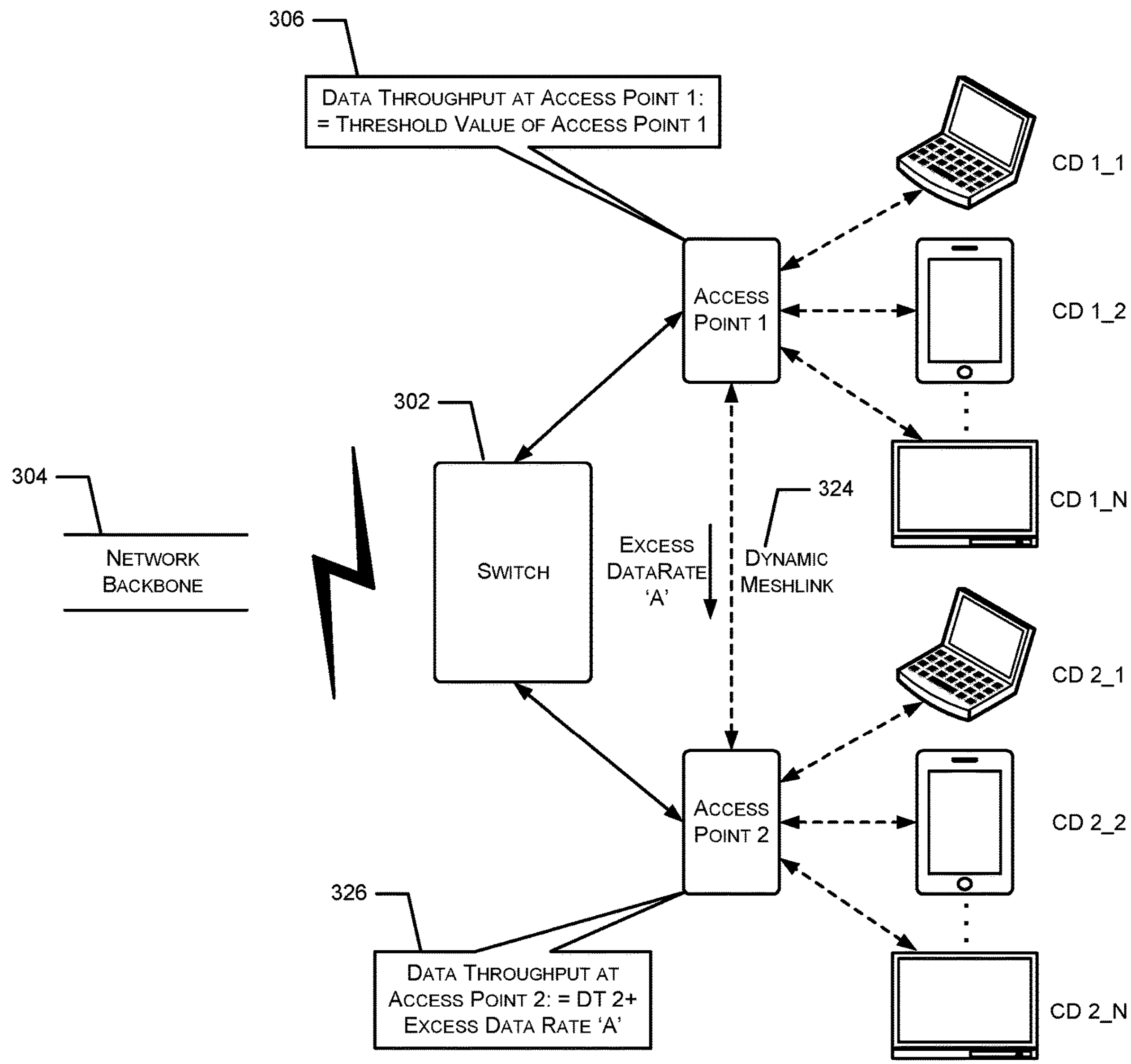

FIGS. 3A and 3B provide a high-level overview of an OTA Wi-Fi offload system in accordance with an embodiment of the present invention. In the context of the present example, Access Point (AP) 1 and AP 2 can be connected by wired links shown as 308 and 310 to a switch 302 that may in turn be connected to a network backbone 304. Those skilled in the art will appreciate that the illustrated connection between APs 1 and 2 switch 302 is completely exemplary as regards the present disclosure is concerned, and the APs can be connected to any other suitable network communication device, e.g. a gateway or a router or any other suitable network security device. Therefore, alternative network architectures that can enable Wi-Fi offloading are well within the scope of the present disclosure.

WLAN client devices, e.g., CD1_1, CD2_1, . . . , CD1_N and CD2_1, CD 2_2, . . . , CD 2_N, may be connected via Wi-Fi to one of the APs associated with the WLAN. For instance, CD1_1, CD2_1, . . . , and CD1_N may be connected to AP 1. Likewise, CD2_1, CD 2_2, . . . , CD 2_N may be connected to AP 2. Further, each AP can have its own wired link data rate threshold beyond which if it carries data, performance of the wireless network it serves (including that of devices therein) can be impaired.

As can be readily understood, the data demand on any network varies dynamically based upon number of devices presently accessing the network (via corresponding Access Points each having their own wired link data rate thresholds/limits) and also based upon applications being run on such devices. For instance, web browsing typically requires much lower data rates than playing a Massively Multiplayer Online Game (MMOG), streaming video or audio content and/or video conferencing, for example. Further, a wireless device may move from one AP to another, thereby lowering the data rate demand on the AP that it is leaving, and increasing it on the one it is joining. As an AP reaches/exceeds its threshold, performance of the network it serves (and the devices connected therein) is severely degraded due to network congestion as described above.

As illustrated in FIG. 3A, data throughput at AP 1 has exceeded its threshold, wherein excess data at an excess data rate 'A' is attempting to be passed through AP 1 as shown at 306, thereby lowering performance of the devices connected thereto due to network congestion. AP 2 is presently handling a throughput of DT 2 as shown.

As illustrated in FIG. 3B, upon the detection of such a situation (e.g., by a WLC or by AP 1), AP 1 establishes a dynamic mesh link shown as 324 with nearby AP 2, enabling AP 2 to process its existing traffic plus the excess traffic offloaded by AP 1, as shown at 326. This traffic can be passed via switch 302 to network backbone 304. In this exemplary implementation, AP 2 can be used to offload traffic from AP 1 for at least a portion of the traffic associated with CD1_1, CD 1_2 and CD 1_N until the threshold of AP 2 is reached, after which traffic going to AP 1 and/or AP 2 can be further offloaded to a third AP (not shown), for instance. During a period of excess traffic load on AP 1, meshlink 324 can be used to allow AP 2 to offload excess traffic from AP 1. For example, excess traffic received by AP 1 from one or more of CD 1_1, CD 1_2 and CD 1_N and directed to AP 2 via meshlink 324 can be communicated to switch 302, which in turn transfers the same to network backbone 304. In this manner, performance of the devices connected to AP 1 and AP 2 can remain optimal by mitigating adverse effects of the wireless bottleneck between AP 1 and switch 302 and AP 2 and switch 302.

As noted earlier, such offloading may be configurable and implemented in various ways. In one scenario, only one client device may be connected to a first AP and may be transmitting different types of application traffic (for instance, an application associated with text data and another application associated with video data). According to one embodiment, the first AP may enable the transfer of one type of data (say, the video data) to a second AP upon the first AP reaching its threshold. Hence, in this configuration, traffic may be offloaded based on the type of application with which it is associated. Similarly, data pertaining to predetermined or configurable applications may be prioritized over other applications so that, for instance, critical applications can run easily. An AP can be made 'application aware' and decide which data traffic goes via the wired link of the AP and which goes to a mesh link connected to another AP. Such an application aware AP may, for instance, direct normal web traffic through the wired link and a video stream through a mesh link using a second AP and in this manner use different AP optimally. Those skilled in the art will appreciate application offloading would involve the AP using tunnel mode.

In another exemplary embodiment, various client devices (each using multiple applications and therefore having various types of data traffic) may be associated with a first AP. Upon the first AP reaching its threshold, all traffic pertaining to a particular client device maybe offloaded to a second AP.

In an exemplary implementation, determination of when/whether/how to offload network traffic can be performed by the AP alone, by the AP in conjunction with input from a WLC or by the AP at the direction of the WLC, wherein WLC can be configured to, in real-time, evaluate the traffic that is passing through a given AP, and based on predefined, configurable or known threshold limits between the AP and its interface to the wired network via switch 302, for example, determine a portion of the network traffic to be offloaded from the AP to a second AP. Furthermore, in another exemplary implementation, the decision regarding to which AP (e.g., the second AP) the excess traffic is offloaded can be performed by the WLC in real-time (or the WLC can configure each AP with a list of one or more offload APs to be used when needed). As part of a real-time decision making process, the WLC can incorporate parameters, e.g. proximity between the AP and other neighboring APs, bandwidth/traffic handling capabilities of other surrounding APs, among other characteristics of the surrounding APs and/or of the AP whose traffic is to be offloaded along with type/parameters of client computing devices involved so as to make the decisions regarding to which AP(s) excess traffic should be offloaded, how much, and in what manner. Such decisions can be made based on a set of rules defined in the WLC and/or in the APs that form part of the system.

Additionally, in other exemplary implementations, part of the decision making can be performed by the APs that form part of the system in conjunction with the WLC, or it is also possible that the complete determination of traffic characteristics, including the AP to which excess traffic is to be offloaded can be performed within the AP experiencing excess traffic load.

In yet another exemplary implementation, it is also possible that a first AP has not yet reached its bandwidth threshold, but a prediction has been made by the first AP and/or by the WLC that the first AP may soon reach its traffic threshold, and hence traffic from new computing devices or even from existing computing devices that are connected to the first AP be offloaded to, using dynamically created/instantiated/established mesh link, a second AP or a group of second APs, which can help enable offloading of network traffic even before the first AP's performance starts deteriorating. Therefore, the timing of offloading of traffic through one or more mesh links can be configured and/or managed based on one or more offloading rules that can be processed in the AP whose traffic is to be offloaded and/or a WLC by which it is managed.

In an aspect, as mentioned above, embodiments of the present invention can further enable identification of second AP as a candidate for the mesh link by the AP experiencing excess traffic load requesting the WLC to select another managed AP associated with the private network with which it should establish the mesh link. Furthermore, the portion of the traffic that is to be offloaded can be based on any or a combination of the device from which the traffic originated, an application associated with the traffic, a protocol associated with the traffic or one or more other characteristics of the traffic.

In another exemplary implementation APs between which the mesh link is dynamically established can be dual-band APs, each, for instance, having a 2.4 GHz radio and a 5 GHz radio, wherein in one implementation, AP can communicate with the one or more wireless/client computing devices via the 2.4 GHz radio and establish the mesh link via the 5 GHz radio. Alternatively, the AP can communicate with the one or more wireless/client computing devices via the 5 GHz radio and can establish the mesh link via the 2.4 GHz radio.

In various alternate exemplary implementations, other relevant parameters can be used to provide off-loading from one AP to another. For instance, time-based off loading wherein one AP offloads a pre-determined amount of traffic to another AP at a pre-determined time of the day can be implemented. In case of a multi-port AP, failure or anticipated failure of a port can be determined and used to trigger offloading. A client computing device can trigger offloading from an AP based upon a signal sent by the device upon its connection with the AP, and such offloading can be connection of the device to another AP or connection of other computing devices connected to the AP to another AP. Such rules, and more, can be configured in the AP whose traffic is to be offloaded and/or the WLC by which the APs are managed.

Figure 4:
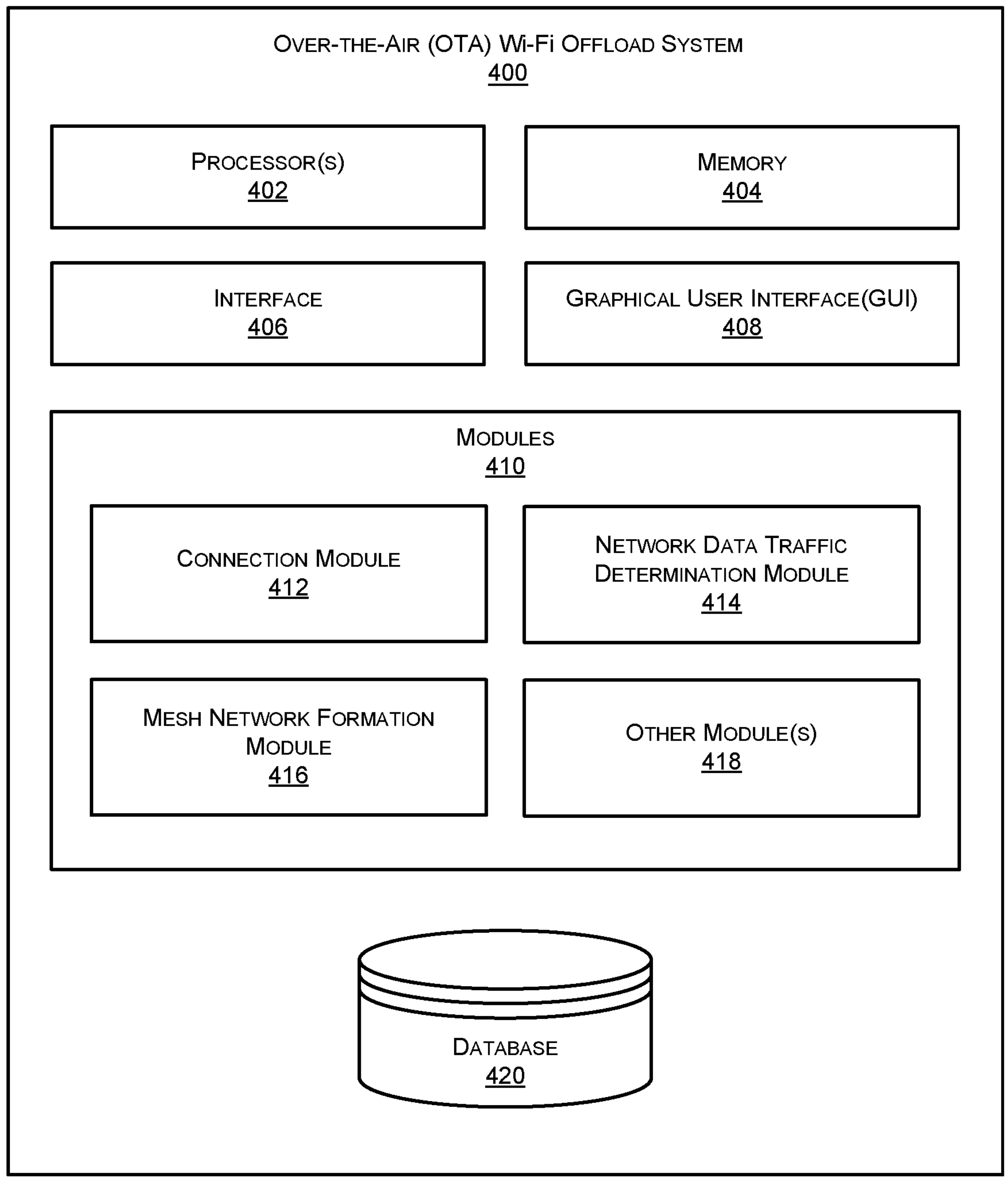
FIG. 4 illustrates a module diagram of an OTA Wi-Fi offload system in accordance with an embodiment of the present invention.

FIG. 4 is a block diagram illustrating an OTA Wi-Fi offload system 400 in accordance with an embodiment of the present invention. In the context of the present example, OTA Wi-Fi offload system 400 includes one or more processor(s) 402. The one or more processor(s) 402 may be implemented as one or more microprocessors, microcomputers, microcontrollers, digital signal processors, central processing units, logic circuitries, and/or any devices that manipulate data based on operational instructions. Among other capabilities, the one or more processor(s) 402 are configured to fetch and execute computer-readable instructions stored in a memory 404 of system 400. Memory 404 may store one or more computer-readable instructions or routines, which may be fetched and executed to create or share the data units over a network service. Memory 404 may include any non-transitory storage device including, for example, volatile memory e.g. RAM, or non-volatile memory like EPROM, flash memory, and the like.

System 400 may also include an interface(s) 406. The interface(s) 406 may include a variety of interfaces, for example, interfaces for data input and output devices, referred to as I/O devices, storage devices, and the like. The interface(s) 406 may facilitate communication of the system 400 with various devices coupled to the system 400. The interface(s) 406 may also provide a communication pathway for one or more components of the system 400. Examples of such components include, but are not limited to modules 410.

The modules 410 may be implemented as a combination of hardware and programming (for example, programmable instructions) to implement one or more functionalities of the modules 410. In the examples described herein, such combinations of hardware and programming may be implemented in several different ways. For example, the programming for the modules 410 may be processor executable instructions stored on a non-transitory machine-readable storage medium and the hardware for the modules 410 may include a processing resource (for example, one or more processors), to execute such instructions. In the present example, the machine-readable storage medium may store instructions that, when executed by the processing resource, implement the modules 410. In such examples, system 400 may include the machine-readable storage medium storing the instructions and the processing resource to execute the instructions, or the machine-readable storage medium may be separate but accessible to system 400 and the processing resource. In other examples, the modules 410 may be implemented by electronic circuitry.

In an aspect, modules 410 can include a connection module 412, a network data traffic determination module 414, a mesh network formation module 416, other modules 418 and database 420.

Other modules 418 may implement functionalities that supplement applications or functions performed by the system 400. Database 420 can store relevant data and make it available to other modules as required. For instance, database 420 can store a list of neighboring candidate mesh link APs and/or the predefined thresholds as elaborated herein for different APs and make them available to relevant modules as required.

In an aspect, connection module 412, when executed by the one or more processor(s), can enable a first wireless access point (AP) of a private network to provide connectivity between one or more wireless client devices and a wired network portion of the private network, wherein the first AP can be coupled to a switch via a first wired link.

In another aspect, network data traffic determination module 414, when executed by the one or more processor(s), can enable the first AP to determine whether an amount of traffic being transmitted on the first wired link exceeds a configurable or predefined threshold (which can represent the wired link data rate threshold of the first AP or a lower value so as to allow the first AP to begin offloading before reaching the wired link data rate threshold).

In yet another aspect, mesh network formation module 416, when executed by the one or more processor(s), can enable the first AP to offload, upon determination that the amount of traffic being transmitted on the first wired link exceeds a configurable or predefined threshold, a portion of the traffic to a second wireless access point (AP) of the private network. Such offloading, in an aspect, can be performed by: dynamically establishing a mesh link between the first AP and the second AP; and causing the traffic to be delivered to the wired portion of the private network via a second wired link, wherein the second AP is coupled to the switch through the second wired link, and transmitting the portion of the traffic via the mesh link to the second AP.

As can be readily understood, the system disclosed including the above modules can be implemented within an AP, within a WLC that manages the APs or distributed among the APs and the WLC.

Further, although system 400 has been described with reference to specific modules, these are only exemplary modules. It is contemplated that actual implementations may include only a part of the modules or a combination of those or a division of those into sub-modules in various combinations across multiple devices that can be operatively coupled with each other, including in the cloud. Further the modules can be configured in any sequence to achieve the objectives elaborated herein. Also, it can be appreciated that system disclosed can be configured in a computing device or across several computing devices operatively connected with each other, wherein the computing devices can be any of a computer, a laptop, a smart phone, an Internet enabled mobile device and the like.

Figure 5:
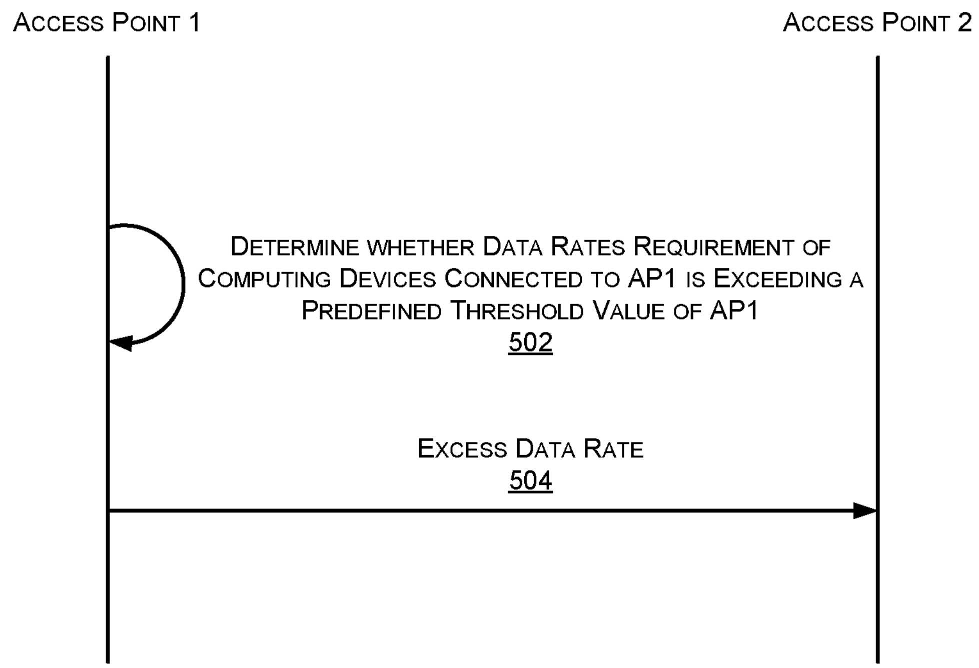
FIG. 5 is a sequence diagram illustrating steps performed by an OTA Wi-Fi offload system in accordance with an embodiment of the present invention.

FIG. 5 is a sequence diagram illustrating steps performed by an OTA Wi-Fi offload system in accordance with an embodiment of the present invention. As illustrated, at step 502, AP 1 can determine or be informed by a WLC whether the data rate requirements of computing devices connected to AP 1 exceed a predefined threshold value associated with AP 1. Upon such a determination, as illustrated at step 504, AP 1 can connect wirelessly with AP 2 via a dynamic mesh link and offload the excess traffic/data rate to AP 2 so as to fulfill the data rate requirements in combination with AP 2, wherein AP 1 and AP 2 form a mesh network.

FIGS. 6A to 6D elaborate upon how mesh links are formed in accordance with an embodiment of the present invention. As illustrated in FIG. 6A and FIG. 6B, at a particular point in time, an access point, AP 1, with a wired link data rate threshold of 500 Mbps may be connected to a computing device, CD 1_1, requiring a data rate of 200 Mbps and computing device CD 1_2 requiring 300 Mbps. Likewise, at the same point in time, access point, AP 2, with a wired link data rate threshold of 1,000 Mbps may be connected to a computing device CD 2_3 requiring 700 Mbps, computing device CD 2_4 requiring 200 Mbps and computing device CD 2_5 requiring 100 Mbps. Access Point AP 3 with a wired link data rate threshold of 1,000 Mbps may be connected to a computing device CD 3_6 requiring 800 Mbps and computing device CD 3_7 requiring 200 Mbps.

As can be appreciated, at this point in time, all APs are operating at or near their data rate threshold levels. The computing devices can be, for instance, Wi-Fi enabled mobile devices that can move from one region to another.

As a result of such movements, for example, as illustrated in FIG. 6C and FIG. 6D, data rate demands on the APs can vary dynamically. At some access points, such demand may exceed their wired link data rate threshold (causing network congestion and deterioration in service levels to connected devices), while some other access points may have excess data transfer capacity at the moment.

As shown at FIG. 6C, at another instant in time, computing device CD 2_5 may shift from a region served by access point AP 2 to that served by AP 1, and likewise computing device CD 3_7 may shift from a region served by access point (AP) 3 to that served by AP 1.

As a result of this movement, as shown in FIG. 6C, the total data rate required to be provided by AP 1 can go up to 800 Mbps which is above its previous wired link data rate threshold of 500 Mbps, and so, AP 1 has an excess data rate demand of 300 Mbps. At the same time, the total data rate required to be serviced by AP 2 can go down to 900 Mbps which is below its previous wired link data rate threshold of 1,000 Mbps, and the total data rate required to be serviced by AP 3 can go down to 800 Mbps, which is below its previous wired link data rate threshold of 1,000 Mbps. In such a situation, as shown in FIG. 6D, embodiments of the present invention can enable AP 1 (which has exceeded its wired capacity at the moment) to offload a portion of its excess traffic by dynamically establishing one or more wireless mesh like links to nearby access points AP 2 and/or AP 3 that have excess capacity at the moment, whereby AP 2 and AP 3 can handle the excess traffic via their respective wired data links.

For instance, a mesh link shown as mesh link 1 can be formed between AP 1 and AP 2. AP 2 has, at the moment, spare wired link data rate capacity of 100 Mbps. So, AP 1 can offload 100 Mbps of its data traffic to AP 2 using mesh link 1. In a similar manner, mesh link 2 can be formed between AP 1 and AP 3. AP 3 has, at the moment, spare wired link data rate capacity of 200 Mbps. So, AP 1 can offload 200 Mbps of its data traffic to AP 3 using mesh link 2. In this manner, the excess demand of 300 Mbps being experienced by AP 1 can be offloaded using dynamically established mesh links between AP 1 and its nearby access points, AP 2 and AP 3.

The mesh links as described above can be dynamically torn down when there is no excess data traffic requirement. Since fast tearing down/building up of meshes as people frequently move in and out of different zones served by different Access Points may not be advisable, appropriate time delays can be incorporated before such tearing down/building up of such mesh links. In another exemplary embodiment, a WLC may keep track of different data traffic and requirements of different APs in the network, determine which are the best APs to be activated for a mesh deployment to handle extra traffic and then dynamically tear down the mesh link when data rate requirements go down.

The systems and methods as described herein are thought to be well suited to legacy networks where existing infrastructure can be used to handle temporary spikes in data traffic at different Access Points and so avoid the need for physically modifying the network and/or cabling to attempt to achieve higher capacities with consequent service interruption and cost implications.

Figure 7:
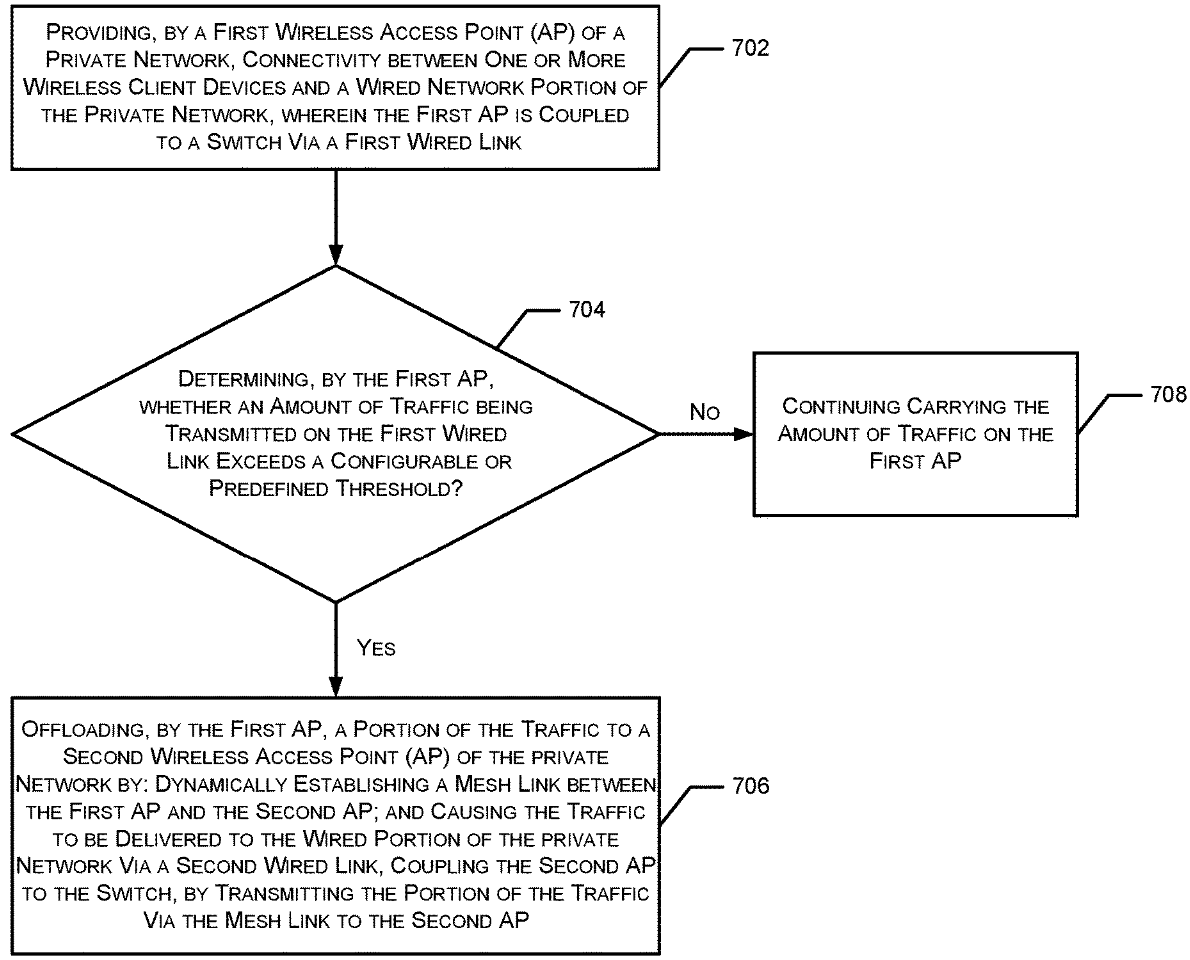
FIG. 7 is a flow diagram illustrating a method of performing OTA Wi-Fi offloading in accordance with an embodiment of the present invention.

FIG. 7 is a flow diagram illustrating a method of performing OTA Wi-Fi offloading in accordance with an embodiment of the present invention. In the context of the present example, the method includes, at block 702, providing, by a first wireless access point (AP) of a private network, connectivity between one or more wireless client devices and a wired network portion of the private network, wherein the first AP is coupled to a switch via a first wired link.

The method further includes, at block 704, determining, by the first AP, whether an amount of traffic being transmitted on the first wired link exceeds a configurable or predefined threshold.

The method further includes, at block 706, when the determining is affirmative, then offloading, by the first AP, a portion of the traffic to a second wireless access point (AP) of the private network by: dynamically establishing a mesh link between the first AP and the second AP; and causing the traffic to be delivered to the wired portion of the private network via a second wired link, coupling the second AP to the switch, by transmitting the portion of the traffic via the mesh link to the second AP.

The method further includes, at block 708, when the determining is negative, continuing carrying the amount of traffic on the first AP.

Figure 8:
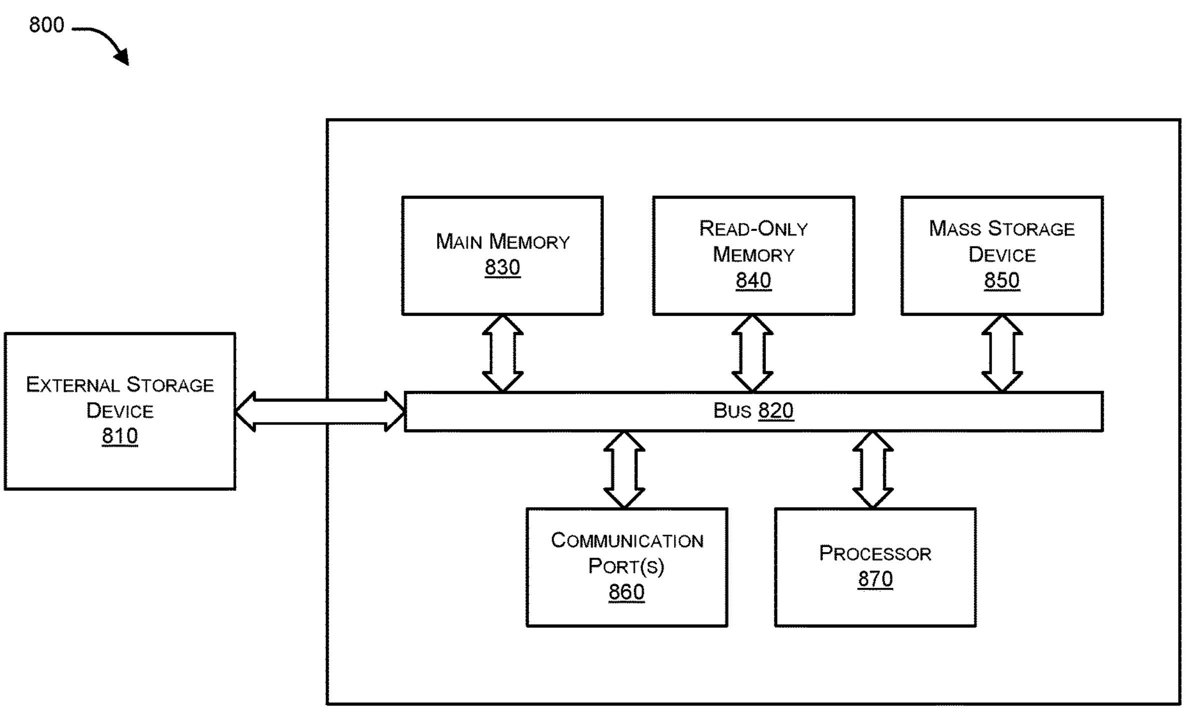
FIG. 8 illustrates an exemplary computer system in which or with which embodiments of present invention may be utilized.

FIG. 8 illustrates an exemplary computer system 800 in which or with which embodiments of present invention may be utilized. Computer system 800 may represent all or some portion of an AP or a WLC or a network security device managing multiple APs of an enterprise. Embodiments of the present invention include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Computer system 800 includes an external storage device 810, a bus 820, a main memory 830, a read only memory 840, a mass storage device 850, communication port 860, and a processor 870. Those skilled in the art will appreciate that computer system 800 may include more than one processor and communication ports. Examples of processor 870 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system 800 connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870. SANs and VSANs may also be deployed.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g. having Universal Serial Bus (USB) and/or Firewire interfaces), e.g. those available from Seagate (e.g. the Seagate Barracuda 7200 family) or Hitachi (e.g. the Hitachi Deskstar 7K1000), one or more optical discs, Redundant Array of Independent Disks (RAID) storage, e.g. an array of disks (e.g. SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system. Optionally, operator and administrative interfaces, e.g. a display, keyboard, and a cursor control device, may also be coupled to bus 820 to support direct operator interaction with computer system 800. Other operator and administrative interfaces can be provided through network connections connected through communication port 860.

External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present invention.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims. For instance although invention disclosed has been elaborated above using wireless computing devices connecting via Wi-Fi to an Access Point, the AP may be configured to offer wired connections or both a combination of wired and Wi-Fi wireless connections and perform as elaborated above.

What is claimed is:

1. A wireless access point (AP) comprising:

one or more processors; and a non-transitory computer readable storage medium embodying a set of instructions, which when executed by the one or more processors cause the one or more processors to perform a method comprising:

providing connectivity between one or more wireless client devices and a wired network portion of a private network, wherein the AP is coupled to a switch via a first wired link;

determining whether an amount of traffic being transmitted on the first wired link exceeds a configurable or predefined threshold by requesting information regarding the amount of traffic from a wireless local area network (LAN) controller (WLC) associated with the private network; and when said determining is affirmative, then offloading a portion of the traffic to a second AP of the private network by:

dynamically establishing a mesh like link between the AP and the second AP; and causing the traffic to be delivered to the wired portion of the private network via a second wired link, coupling the second AP to the switch, by transmitting the portion of the traffic via the mesh like link to the second AP, wherein the AP and the second AP comprise dual-band APs each having a 2.4 gigahertz (GHz) radio and a 5 GHz radio.

2. The AP of claim 1, wherein the method further comprises monitoring the amount of traffic.

3. The AP of claim 1, wherein the method further comprises identifying the second AP as a candidate for the mesh like link by requesting the WLC to select an AP of a plurality of APs of the private network.

4. The AP of claim 1, wherein the method further comprises identifying the portion of the traffic based on any or a combination of a type of the traffic, one or more characteristics of the traffic and an application with which the traffic is associated.

5. The AP of claim 1, wherein the AP communicates with the one or more wireless devices via the 5 GHz radio and establishes the mesh like link via the 2.4 GHz radio.

6. A method comprising:

providing, by a first wireless access point (AP) of a private network, connectivity between one or more wireless client devices and a wired network portion of the private network, wherein the first AP is coupled to a switch via a first wired link;

determining, by the first AP, whether an amount of traffic being transmitted on the first wired link exceeds a configurable or predefined threshold by requesting information regarding the amount of traffic from a wireless local area network (LAN) controller (WLC) associated with the private network; and when said determining is affirmative, then offloading, by the first AP, a portion of the traffic to a second AP of the private network by:

dynamically establishing a mesh like link between the first AP and the second AP; and causing the traffic to be delivered to the wired portion of the private network via a second wired link, coupling the second AP to the switch, by transmitting the portion of the traffic via the mesh like link to the second AP, wherein the first AP and the second AP comprise dual-band APs each having a 2.4 gigahertz (GHz) radio and a 5 GHz radio.

7. The method of claim 6, further comprising monitoring, by the first AP, the amount of traffic.

8. The method of claim 6, further comprising identifying, by the first AP, the second AP as a candidate for the mesh like link by requesting the WLC to select an AP of a plurality of APs of the private network.

9. The method of claim 6, further comprising identifying, by the first AP, the portion of the traffic based on any or a combination of a type of the traffic, one or more characteristics of the traffic and an application with which the traffic is associated.

10. The method of claim 6, wherein the first AP communicates with the one or more wireless devices via the 5 GHz radio and establishes the mesh like link via the 2.4 GHz radio.

11. A non-transitory computer-readable storage medium embodying a set of instructions, which when executed by one or more processors of a wireless access point (AP) associated with a private network, causes the one or more processors to perform a method comprising:

providing connectivity between one or more wireless client devices and a wired network portion of the private network, wherein the AP is coupled to a switch via a first wired link;

determining whether an amount of traffic being transmitted on the first wired link exceeds a configurable or predefined threshold by requesting information regarding the amount of traffic from a wireless local area network (LAN) controller (WLC) associated with the private network; and when said determining is affirmative, then offloading a portion of the traffic to a second AP, comprising of the private network by:

dynamically establishing a mesh like link between the AP and the second AP; and causing the traffic to be delivered to the wired portion of the private network via a second wired link, coupling the second AP to the switch, by transmitting the portion of the traffic via the mesh like link to the second AP, wherein the AP and the second AP comprise dual-band APs each having a 2.4 gigahertz (GHz) radio and a 5 GHz radio.

12. The non-transitory computer-readable storage medium of claim 11, wherein the method further comprises monitoring the amount of traffic.

13. The non-transitory computer-readable storage medium of claim 11, wherein the method further comprises identifying the second AP as a candidate for the mesh like link by requesting the WLC to select an AP of a plurality of APs of the private network.

14. The non-transitory computer-readable storage medium of claim 11, wherein the method further comprises identifying the portion of the traffic based on any or a combination of a type of the traffic, one or more characteristics of the traffic and an application with which the traffic is associated.

15. The non-transitory computer-readable storage medium of claim 11, wherein the AP communicates with the one or more wireless devices via the 5 GHz radio and establishes the mesh like link via the 2.4 GHz radio.

16. A wireless access point (AP) comprising:

one or more processors; and a non-transitory computer readable storage medium embodying a set of instructions, which when executed by the one or more processors cause the one or more processors to perform a method comprising:

providing connectivity between one or more wireless client devices and a wired network portion of a private network, wherein the AP is coupled to a switch via a first wired link;

determining whether an amount of traffic being transmitted on the first wired link exceeds a configurable or predefined threshold; and when said determining is affirmative, then offloading a portion of the traffic to a second AP of the private network by:

identifying the second AP as a candidate for the mesh like link by requesting a wireless local area network (LAN) controller (WLC) associated with the private network to select an AP of a plurality of APs of the private network;

dynamically establishing a mesh like link between the AP and the second AP; and causing the traffic to be delivered to the wired portion of the private network via a second wired link, coupling the second AP to the switch, by transmitting the portion of the traffic via the mesh like link to the second AP, wherein the AP and the second AP comprise dual-band APs each having a 2.4 gigahertz (GHz) radio and a 5 GHz radio.

17. The AP of claim 16, wherein the method further comprises monitoring the amount of traffic.

18. The AP of claim 16, wherein the method further comprises identifying the portion of the traffic based on any or a combination of a type of the traffic, one or more characteristics of the traffic and an application with which the traffic is associated.

19. The AP of claim 16, wherein the AP communicates with the one or more wireless devices via the 5 GHz radio and establishes the mesh like link via the 2.4 GHz radio.

20. A non-transitory computer-readable storage medium embodying a set of instructions, which when executed by one or more processors of a wireless access point (AP) associated with a private network, causes the one or more processors to perform a method comprising:

providing connectivity between one or more wireless client devices and a wired network portion of the private network, wherein the AP is coupled to a switch via a first wired link;

determining whether an amount of traffic being transmitted on the first wired link exceeds a configurable or predefined threshold; and when said determining is affirmative, then offloading a portion of the traffic to a second AP, comprising of the private network by:

identifying the second AP as a candidate for the mesh like link by requesting a wireless local area network (LAN) controller (WLC) associated with the private network to select an AP of a plurality of APs of the private network;

dynamically establishing a mesh like link between the AP and the second AP; and causing the traffic to be delivered to the wired portion of the private network via a second wired link, coupling the second AP to the switch, by transmitting the portion of the traffic via the mesh like link to the second AP, wherein the AP and the second AP comprise dual-band APs each having a 2.4 gigahertz (GHz) radio and a 5 GHz radio.

21. The non-transitory computer-readable storage medium of claim 20, wherein the method further comprises monitoring the amount of traffic.

22. The non-transitory computer-readable storage medium of claim 20, wherein the method further comprises identifying the portion of the traffic based on any or a combination of a type of the traffic, one or more characteristics of the traffic and an application with which the traffic is associated.

23. The non-transitory computer-readable storage medium of claim 20, wherein the AP communicates with the one or more wireless devices via the 5 GHz radio and establishes the mesh like link via the 2.4 GHz radio.

* * * * *